Nov. 17, 1936.                F. LE R. FRANCISCO                2,061,420
                              VEHICLE STORAGE STRUCTURE
                              Filed Aug. 22, 1933              7 Sheets-Sheet 1
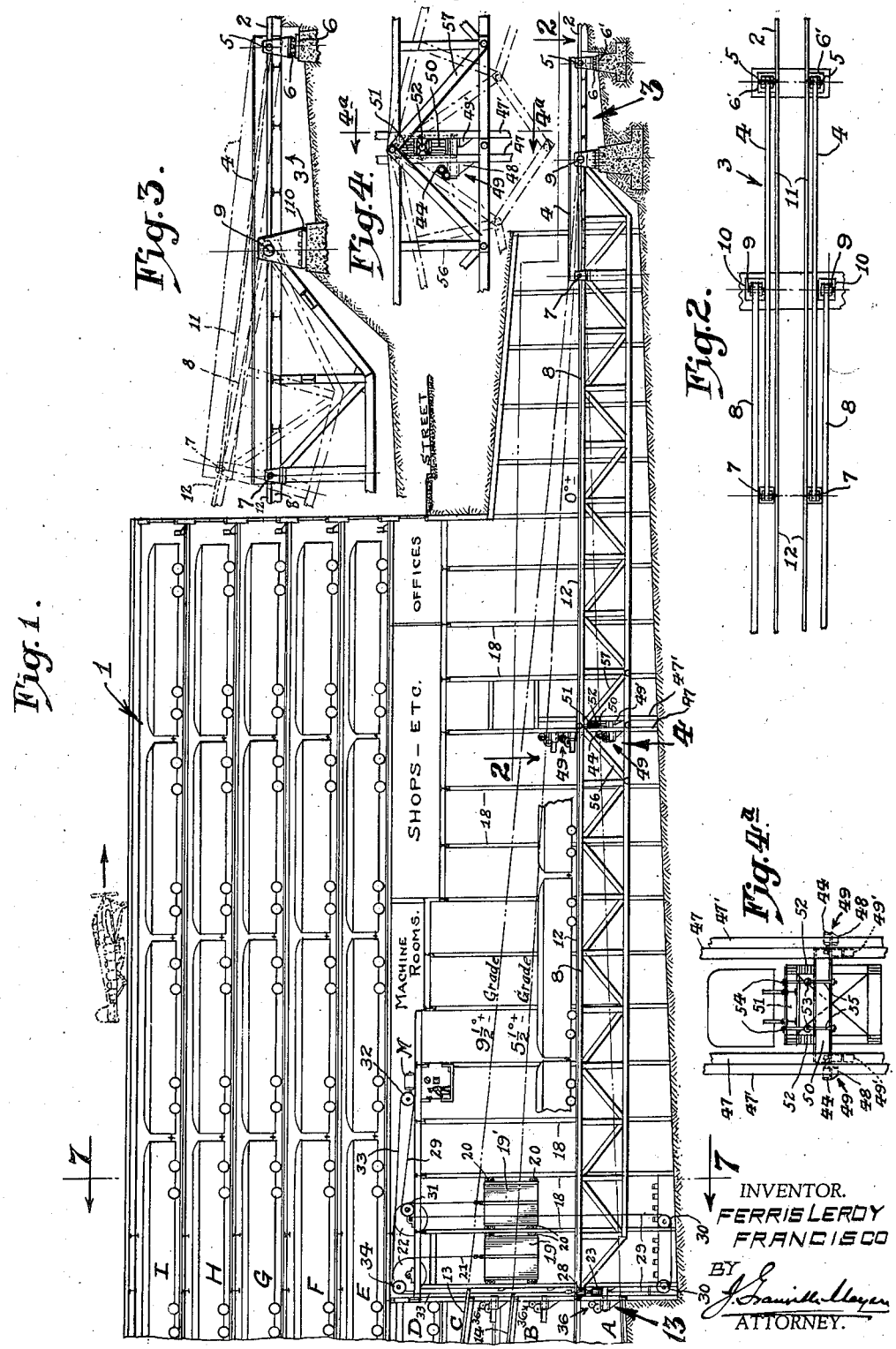
INVENTOR.
FERRIS LEROY
FRANCISCO
BY
ATTORNEY.

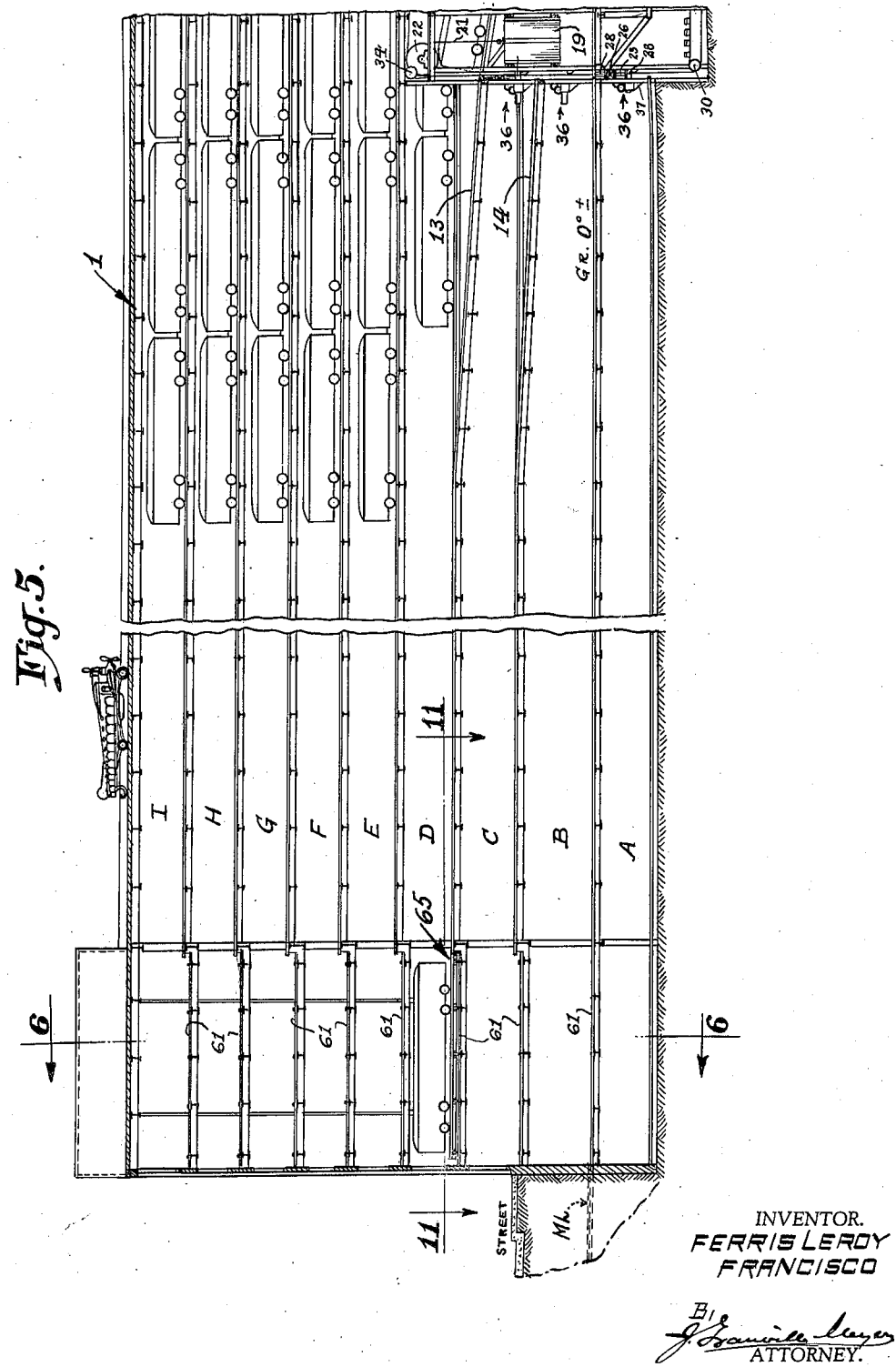

INVENTOR.
FERRIS LEROY
FRANCISCO
ATTORNEY.

Nov. 17, 1936.    F. LE R. FRANCISCO    2,061,420
VEHICLE STORAGE STRUCTURE
Filed Aug. 22, 1933    7 Sheets-Sheet 4
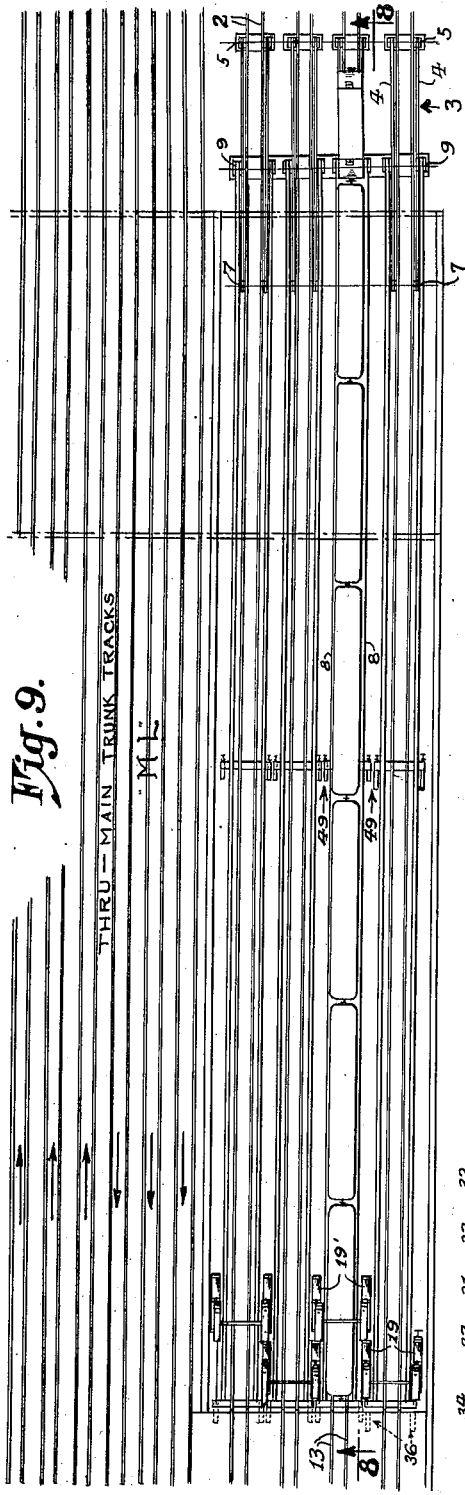
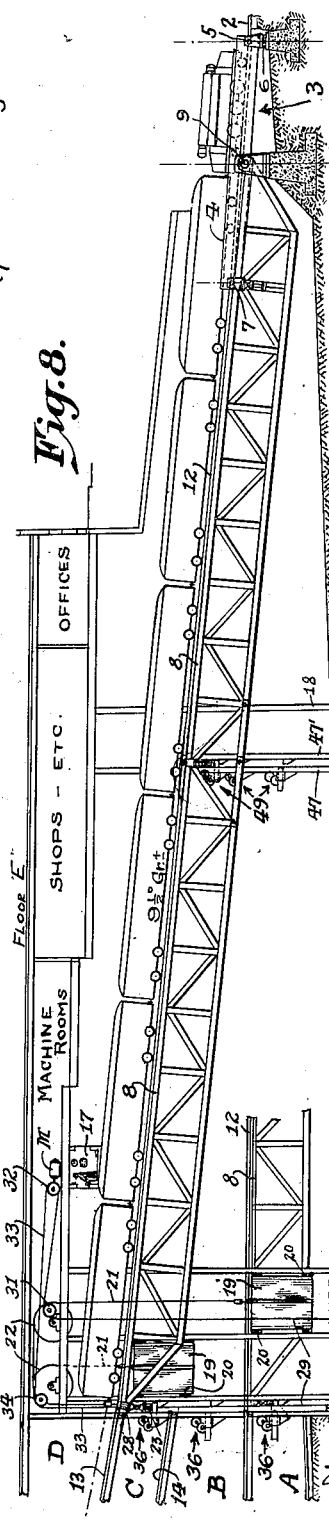
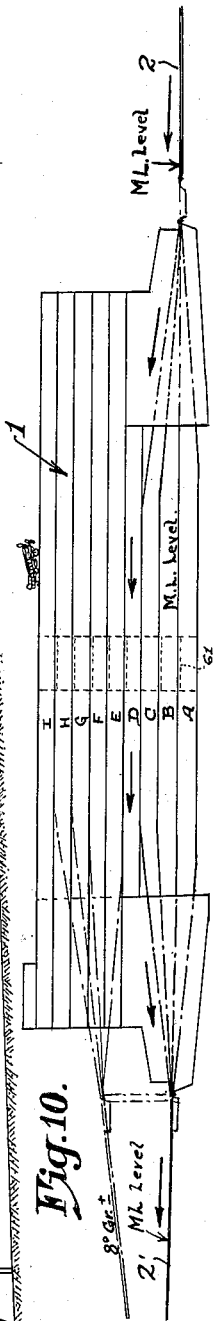
INVENTOR.
FERRIS LE ROY
FRANCISCO
ATTORNEY.

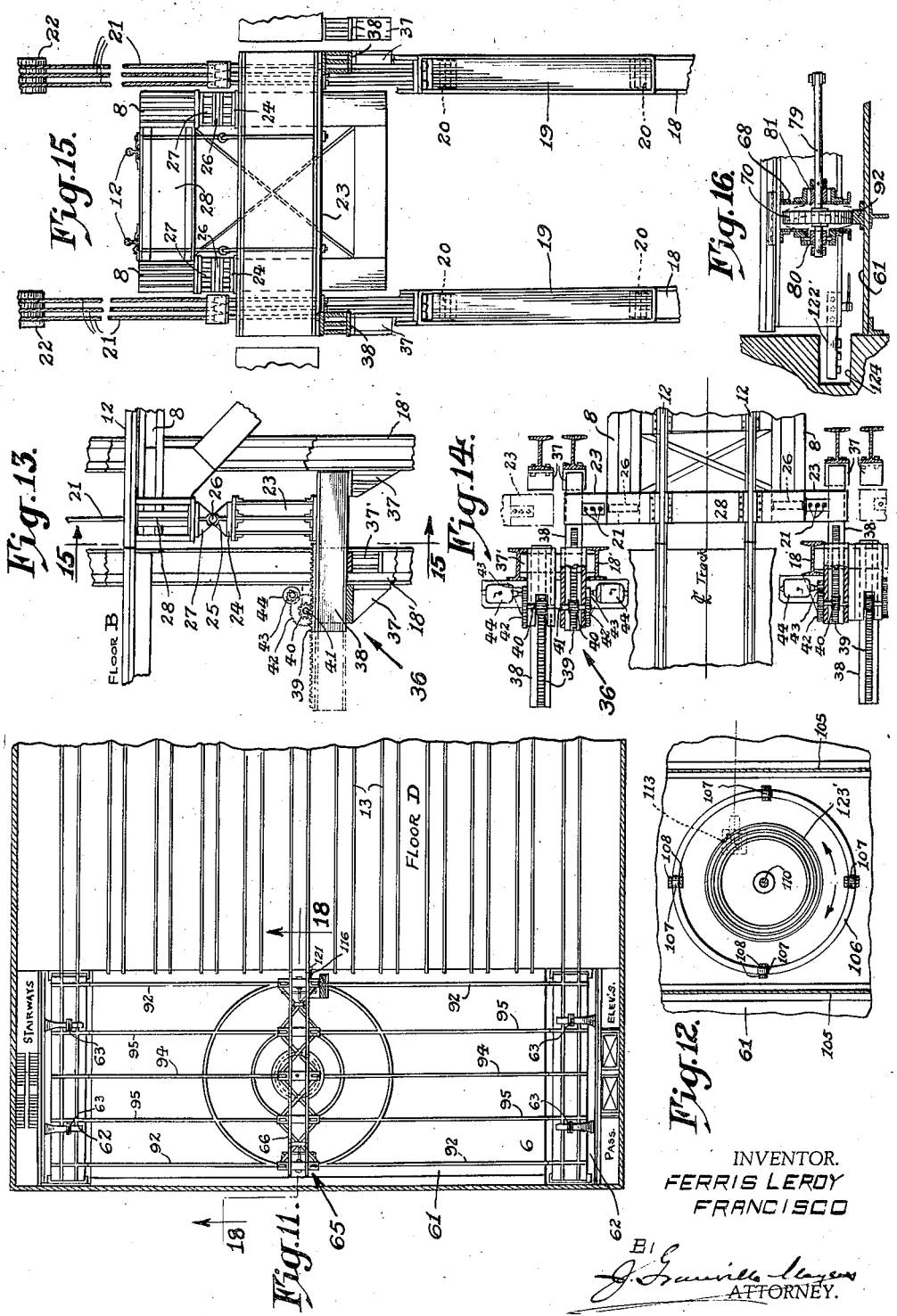

Nov. 17, 1936.  F. LE R. FRANCISCO  2,061,420
VEHICLE STORAGE STRUCTURE
Filed Aug. 22, 1933   7 Sheets-Sheet 6

INVENTOR.
FERRIS LEROY
FRANCISCO
BY
ATTORNEY.

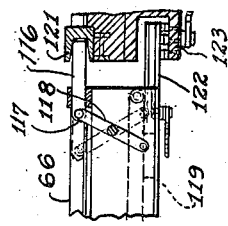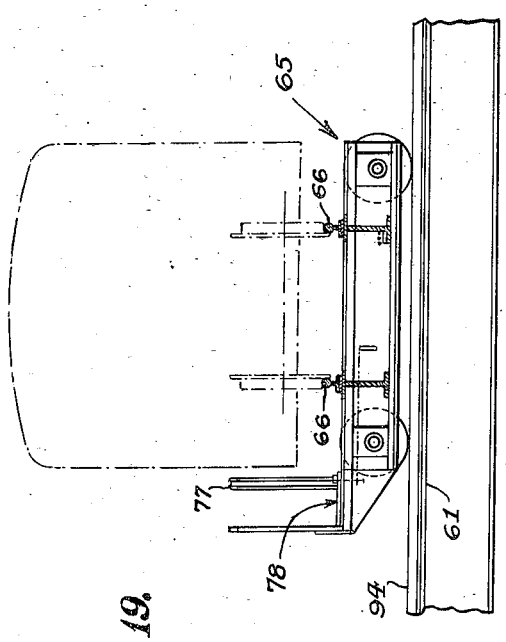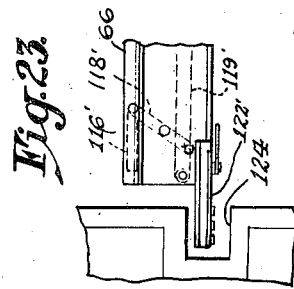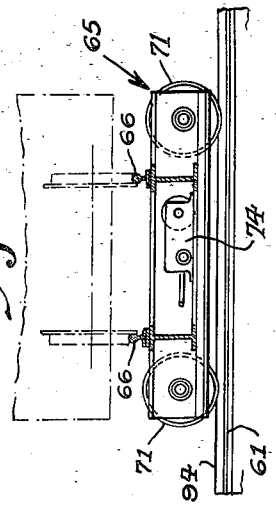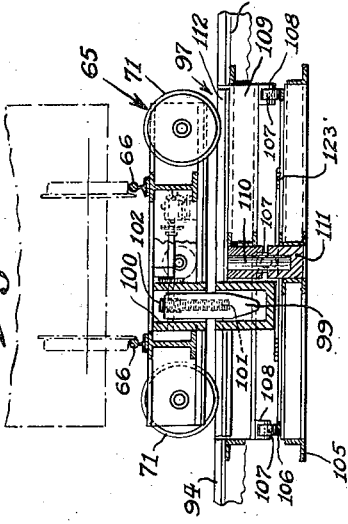

Patented Nov. 17, 1936

2,061,420

UNITED STATES PATENT OFFICE 2,061,420

VEHICLE STORAGE STRUCTURE

Ferris Le Roy Francisco, New York, N. Y.

Application August 22, 1933, Serial No. 686,293

11 Claims. (Cl. 214—16.1)

My invention relates to vehicle storage structures, and particularly to storage terminals and equipment for railroad cars and trains.

Railroad companies have for a long time been confronted with the serious problem, particularly in large cities, of storing idle trains and cars. Up to the present time, particularly in the larger cities, incoming trains must be unloaded and then conveyed a considerable distance, due to lack of track space within the city, to sidings or yards outside of the city, where they are kept until such time as the cars are cleaned and placed in condition for use on a return trip. Usually, these sidings are located in the open, so that the cars are subjected to rain, snow, cold, heat, dust, etc. In summer the cars become very hot and in winter very cold, due to the fact that it is extremely expensive to maintain an engine connected to the trains to supply them with heat. Furthermore, the cars must be moved a considerable distance from the terminals to the sidings or yards and this results in considerable expense, not only because of the fact that considerable power or fuel is consumed in moving the train to the open storage space, but also because of the necessity of having the crew on board to conduct or convey the train to the yards.

With respect to the disadvantage of subjecting the train or cars to atmospheric conditions in the open, it has recently been the custom to provide special auxiliary conditioning apparatus to cool the cars within the station after they have been brought from the siding or yard in the summer time, and in the winter time to warm the cars by connecting them in groups to sources of steam supply before the engine is coupled to the train. In some stations these groups of cars must be shifted and coupled to form the train just before leaving time.

The foregoing difficulties are due largely to the lack of ground space or the expense and high taxes on ground space adjacent the stations in the larger cities, and consequently only a limited number of tracks lead from the yards to the stations.

With the foregoing in mind, the principal objects of my invention, considered generally and in its broader aspects, may be said to reside in first, providing storage facilities or space in proximity to or in connection with railroad terminals or stations to accommodate a great number of cars and/or trains within the confines of a relatively small ground area; second, to provide in connection with the foregoing, means for maintaining the cars or trains at desirable temperatures within said storage space without employing extraneous apparatus to be coupled to the trains; and third, to materially reduce the cost of conveying the trains to and from the terminal and the storage space.

The first object stated above is accomplished by providing a building occupying part or all of the track space between a station and yards through which trains may pass, and having a plurality of floors on which tracks are provided to receive cars and trains which otherwise would be transported from the station to the yards. The second object is accomplished by heating or cooling the building, according to the season and prevailing temperatures; and the third object is accomplished by the great reduction in distance the trains must travel from station to storage space.

Other important general objects of the invention are the provision of means for selectively establishing a track connection between the station tracks and those on the different floors of the building; means for shifting cars within the building from one track to another as well as from one floor to another; and means for turning cars within the building.

The foregoing general objects of the invention may be accomplished by the construction and arrangement disclosed in the accompanying drawings, and the specific objects and advantages of the invention will be better understood after reading the following detailed description, during which such objects and advantages will also be pointed out or referred to.

In the drawings,

Fig. 1 is a view taken on the line 1—1 of Fig. 7 and representing a longitudinal sectional view in side elevation of a fragment of a building structure embodying the invention;

Fig. 2 is a view on the line 2—2 of Fig. 1;

Fig. 3 is an enlarged fragmentary view in side elevation of the compensating bridge truss and the trunnions;

Fig. 4 is a view showing the pivotal connection at the center of the main bridge member enlarged;

Fig. 4a is a front view of the parts shown in Fig. 4;

Fig. 5 is a continuation in longitudinal section of the building structure shown in Fig. 1;

Fig. 8 is a view taken on the line 8—8 of Fig. 7 and showing the complete bridge in elevated position;

Fig. 9 is a plan view of several tracks and bridges shown in Fig. 8;

Fig. 10 is a diagrammatic view in elevation of a complete storage structure illustrating a modification of the invention;

Fig. 11 is a view taken on the line 11—11 of Fig. 5;

Fig. 12 is a plan view taken on the line 12—12 of Fig. 18;

Fig. 13 is an enlarged side elevation of a bridge support;

Fig. 14 is a plan view of the structure shown in Fig. 13;

Fig. 15 is a view taken on the line 15—15 of Fig. 13;

Fig. 16 is an enlarged detailed view of the parts designated by the arrow 16 in Fig. 18;

Fig. 19 is a view taken on the line 19—19 of Fig. 17;

Fig. 20 is a view taken on the line 20—20 of Fig. 17;

Fig. 21 is a view taken on the line 21—21 of Fig. 17; and

Figs. 22 and 23 are detailed views of locking and contact arrangement for the transfer table.

Figure 7:
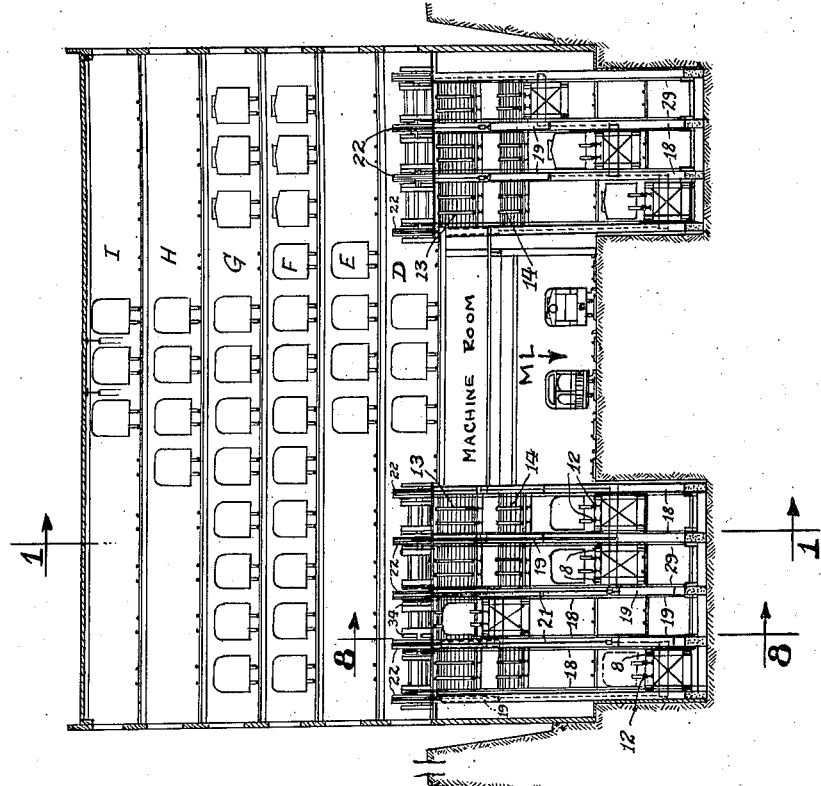
Fig. 7 is a view taken on the line 7—7 of Fig. 1.

Referring to the drawings and particularly to Figs. 1-5, the numeral 1 designates generally the storage terminal or building which may be a part of the railroad station and annexed thereto, or as shown, a separate structure spaced from the station and built preferably over the existing tracks which lead into the station. The building may have any number of floors and may be of a width corresponding to or greater or less than the tracks leading into the station. The length of the building is optional. The numeral 2 designates a fragment of the tracks leading from the station to the storage terminal 1, and at the end of which is a compensating bridge section 3 composed of trusses 4, each pivotally mounted on trunnions 5 resting on rollers 6 on a base 6' in the foundation. The other ends of the trusses 4 are pivotally connected by trunnions 7 to the trusses 8 of the main bridge member. The trusses 8 are pivotally connected at one end to trunnions 9 supported on a base 10. The trusses 4 and 8 are shown as truncated and inverted, and they support track sections 11 and 12 respectively, there being a pair of trusses for each section of track 2, and the rails 11 and 12 being in alinement with the tracks 2 so that the trains can pass from the tracks onto the bridge rails and thereover as hereinafter explained. For the present, it is only necessary to describe the construction and operation of one of the bridges because each one is identical, and the number thereof may vary according to the need at the particular railroad terminal where the invention is to be installed.

The purpose of having the trusses 4 pivotally connected to trunnions 5 and to the main trusses 8 is to reduce the angle of inclination between the main bridge and the tracks 2 when the bridge is elevated as hereinafter explained. At the other end of the bridge, that is, the end remote from the tracks 2, the building has several floors each provided with tracks in alinement with the bridges. There are two floors A and B shown in Fig. 5 beneath the main level, so that trains may be run from the tracks 2 across the bridges to be stored on the floors A and B below the main level as well as on floors C and D above the main level also served by the bridges. The main level tracks ML (Figs. 6 and 7) pass through the center of the building and when a train is coming into the station or going out of the station it passes thereover, although the bridges may be placed in a position where they register with the tracks 2 and tracks of the main level at the other end of the building, so that the train may pass in or out of the station over a bridge. When a train has been unloaded and is to be cleaned and stored, the bridge is raised or lowered to one of the floors A, B, C or D, and the train passes across the bridge under power of the locomotive or other mechanical means into a predetermined storage space within the building.

It will be noted that the ends of the tracks on the upper floors C and D slope downwardly toward the bridges, as indicated by the numerals 13 and 14 in Figs. 1 and 5, and that the track sections 13 on the uppermost floor are inclined at a greater angle than the tracks 14 on the floor C. The ends of the tracks 13 project outwardly further than the tracks 14 to bring the ends of the tracks as close as possible to the ends of the rails 12 carried by the bridge when the bridge is moved into registry with the track sections 13 and 14, it being understood that the end of the bridge swings through an arc when being raised and lowered and at floor D is in a different plane than at floor C.

In Fig. 8, the bridge is shown in registry with the tracks 13 on floor D, so that the train may pass thereover to and from the floor on which the track 13 is located to the tracks 2 in alinement therewith and into or out of the station. The means for raising and lowering the bridge may be any suitable type of elevating mechanism of sufficient power, and illustrative mechanism is shown generally in Figs. 1, 7, and 8. There is an operating room 17 for each bridge located to afford the operators a clear view of the tracks in both directions and the control for the elevating mechanism is located in this room. As shown in Fig. 7, the space within which the bridges operate are divided by rows of columns 18. In Figs. 1 and 15, the elevating mechanism for the bridges is shown as comprising pairs of weights 19 and 18', the former being for one bridge and the latter for the next bridge. The weights operate between selected columns 18 and have rollers 20 engaging with the columns or riding in or on a track provided on the columns. Cables 21 are secured to the weights 19, and these cables are trained around large grooved sheaves 22 and are connected at their other ends to the cross beam or girder 23 which carries the end of the bridge. The cables are of such length that when the bridge is at the uppermost floor to which it can be raised the weights will be down at the bottoms of the columns 18, and when the bridge is at the lowermost floor, the weights will be at the tops of the columns 18.

Referring to Figs. 13 and 15, it will be noted that the girders 23 have rigidly connected thereto, a base 24 provided with an arcuate surface 25 receiving a roller or rollers 26 on which rests a corresponding arcuate surface of another base 27 carried by girders 28 corresponding to the girders 23, and supporting the tracks 12. Thus the free end of the bridge is flexibly supported on the girders 23 which are carried by the cables 21 and the parts 24 and 27 may have relative movement to compensate for the angles at which the bridge is placed relative to columns 18 during raising and lowering. Down-haul cables 29 are attached to the girders 23 and are then trained around pulleys 30 adjacent the bottom of the columns and a pulley 31 adjacent the top of the columns, and then around the drum 32 driven by the motor M. The other ends of the cables are attached to the girders 28, and are trained around the pulley 34 and drum 32 for uplift. Obviously, when the motor M rotates the drum 32 in a clockwise direction, the cable 33 is moved to lift the free end of the bridge, and when the motor is rotated in a contra-clockwise direction, the cables pull down on the bridge support or girders 23 lowering the bridge.

On each of the floors and adjacent the ends of the track sections 13, 14, etc., there are mounted automatic locking devices designated generally in Fig. 1 by the numeral 36, and shown in detail in Figs. 13 and 14. The columns 18', which correspond to the columns 18, are closer together at the free end of the bridge than are the columns 18, and these columns 18' have rigidly secured thereto, supports 37. Relatively short beams 38 are slidably mounted adjacent the free ends of the track sections on the respective floors served by the bridge, and are movable between columns 18' on the supports or castings 37, and short beam 37' connected between a pair of the columns, by rack bars 39, the teeth of which mesh with pinions 40 on shafts 41, also keyed to gears 42, meshing with gears 43 driven by motors 44 in electric circuits controlled by switches in the operator's room. The beams 38 for each floor are located below the respective track sections a distance corresponding substantially to the height of the girders 23, 28, and the flexible connection therebetween, so that when the bridge has been elevated by mechanism previously described to bring the track sections 12 substantially into alinement with the track sections 13, 14, etc., the beams 38 may be projected across the supports 37 and 37', whereby the girders 23 will rest on the beams 38 to firmly support the bridge during passing of a train thereover.

In many cases the storage floors will be used for trains of considerable length, and, therefore, in order to convey the trains from the tracks 2 to the storage floors, the bridges must be of considerable length, say, for instance, 400 ft. A bridge of such length and supporting the tremendous weight of railroad trains if made in a single span would require trusses with members of great size and strength, due to the fact that the bridge and the weight passing thereover would be supported only by the trunnion and the locking devices adjacent the elevating means. However, under the construction about to be described, I can provide for a bridge say of 400 ft. equivalent to two spans of 200 ft. each, with the weight of the train equally supported on both sides of the center, that is, each of the hypothetical spans supporting half of the load. This may be accomplished by the construction shown in Figs. 1 and 4, wherein pairs of columns 47, 47', similar to the columns 18', are spaced relatively close together adjacent the centers of the bridges. The columns 47 have supports 48 for automatic locking mechanism designated generally by the numeral 49 and identical to the apparatus described in connection with Figs. 13 and 14, that is, a sliding beam operated by a rack bar and gears from motors controlled in synchronism with the motors 44. The columns 47' have brackets or supports 49' to receive the sliding beam. The girders 50 and 51 have a swiveled relation through the pin bearing 52 and the girders may be held in proper elevation on the truss by swiveled link connections 53 of Fig. 4a, the interengaging links being supported by bolts 54 and 55 secured to the girders 51 and 50 respectively. The supports 48 and 49' on the columns 47' are arranged at such points that when the bridge is elevated, the locking mechanism 49 will project the proper beams onto the supports 48 and 49' at the same time that the locking mechanism on the columns 18' is projected onto the supports 37 and 37' according to the elevation of the bridge. In Fig. 4, the dotted line position of the parts is a greatly exaggerated illustration of how the bridge acts as a two simple span bridge and showing the yielding movement at the center of the bridge, it being noted that the two halves 56 and 57 of the main trusses 8 are pivoted in the top chords and that the bottom chords between these two halves 56 and 57 are pin connected in three places, forming truss members that are capable of tension only.

Referring to Fig. 7, it will be noted that I have illustrated a storage structure having seven bridges and between the bridges six tracks. The purpose is to illustrate how the bridges may be utilized purely for the purpose of conveying trains to and from the storage floors, it being understood that the six tracks designated generally by the letters ML form the main level tracks over which the trains travel into the station and out of the station from and to other terminals. If desired, however, the bridges can be lowered to the main level tracks and used to convey the trains from the station tracks 2 to the main tracks outside of the terminal. By suitable switches at the station, the trains which come in over the tracks ML may be switched onto the tracks leading to the bridges and vice versa.

In Fig. 10, I have shown how bridges may be arranged at both ends of the storage structure to convey trains into and out of the structure and to various floors thereof from either end. The details of construction and operation of such double structure would be the same as shown and described in connection with the single structure and no repetition thereof need be made.

Another feature which is quite obvious, and, I think, needs no detailed showing, is the possibility of providing within the storage structure say from floor D of Fig. 5 to floor E, a ramp running from the left to the right, and from floor E to floor F a ramp running in the opposite direction, and so on, so that trains could be conveyed from one floor to another within the building after delivery thereto by the bridge.

In Figs. 5, 6, 11, 12, 16–23, I have shown means for shifting cars from one track to another, for conveying single cars or units of cars from one floor to another, and for turning the cars within the structure if necessary. This latter feature is most desirable in connection with dining cars and observation cars in making up a train within the storage structure.

Figure 6:
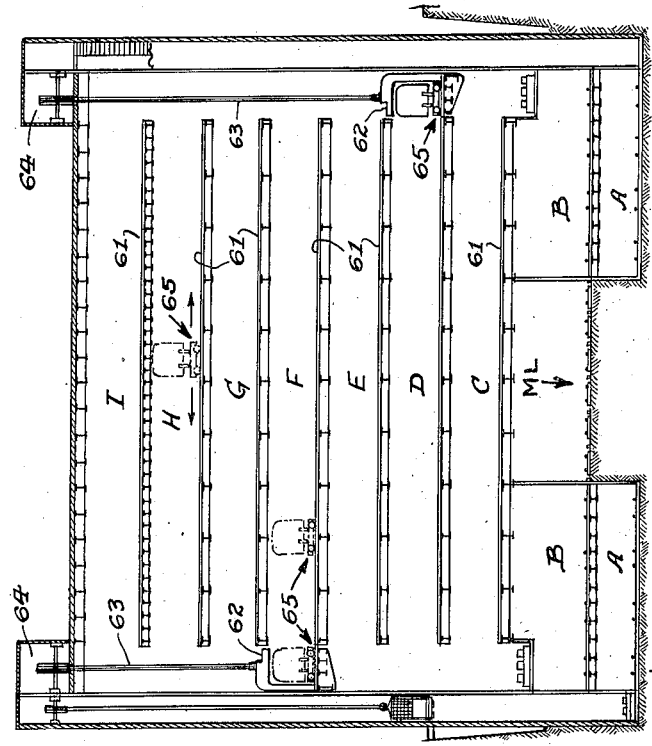
Fig. 6 is a view taken on the line 6—6 of Fig. 5.

Referring at present to Figs. 5 and 6, it will be noted that within the building remote from the bridge, I have shown floors 61 slightly below the floors I, H, G, F, E, D and C, and each supporting tracks running transversely to the tracks on the floors C, D, E, etc. The floors 61 terminate in spaced relation to the side walls or one side wall of the structure to provide a space or spaces to accommodate either at one or both sides of the building elevators 62. The elevators are supported by cables 63 and are operated by any suitable elevator operating mechanism, which may be housed in a room or rooms 64 on the roof of the structure. The elevators may be of sufficient length to accommodate one or more railroad cars and carry a combined transfer and turn table designated generally by the numeral 65 in Figs. 5 and 6 and shown in detail in Figs. 11, 12, 17 and 18.

Figures 17, 18:
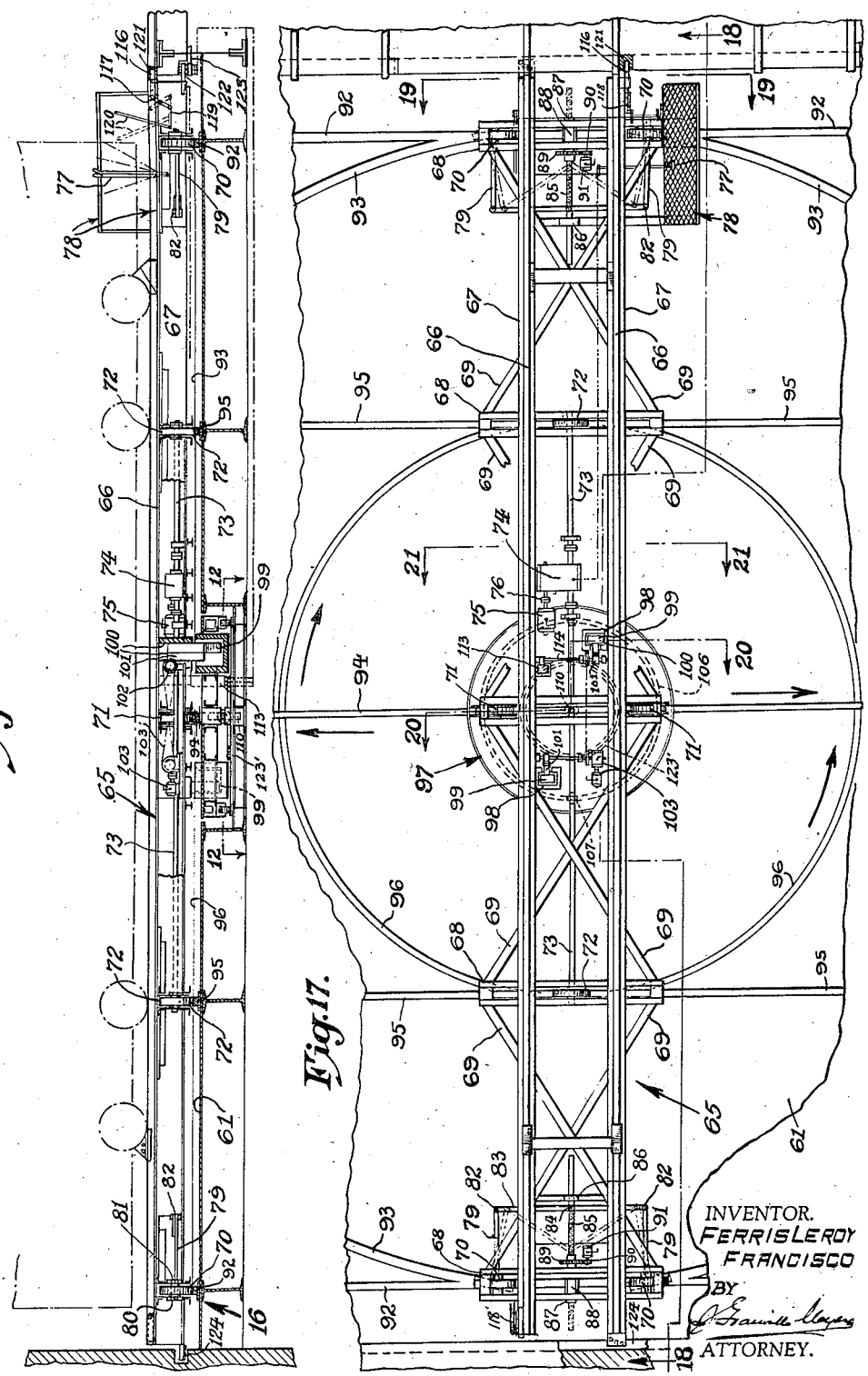
Fig. 17 is an enlarged plan view of the transfer and turn table shown in Fig. 11.
Fig. 18 is an enlarged view taken on the line 18—18 of Fig. 11.

Referring to Figs. 17 and 18 in detail the numeral 66 designates rails of standard section mounted on insulated and rubber cushioned plates of standard design fastened to continuous stringers 67 which are rigidly supported by cross girders 68 braced by trusses 69. The cross girders 68 contain bearings for wheels 70 adjacent each end of the track sections, wheels 71 at the center of the track section, and wheels 72 intermediate the wheels 70 and 71. The shafts 73 are keyed to the wheels 72 and are driven from the gear box or transmission 74 which in turn is driven by an electric motor 75 through suitable connections not shown in detail except the shaft 76 in Fig. 17 leading from the motor into the gear box or transmission 74. The transmission includes known elements such as a speed reducer, and gearing arranged to drive the shafts 73 jointly in the same direction or for driving them in opposite directions, such parts being operated by levers indicated generally by the numeral 77 located at the operator's platform 78 adjacent one end of the combined transfer platform and turn table. The wheels 70 are mounted on axles 79, which are supported on opposite sides of the vertical plane of the axis of the shaft 73, by vertical pivoted bearings 80 and a horizontally sliding or rolling bearing 81, so that the axes of the axles 79 may be arranged to be parallel to the longitudinal axis of the transfer table or to be located on diameters through the vertical pivots on the bearings 80 and the geometrical center of the transfer table. To accomplish this the axles 79 are connected by a pin hinge 82 to rods 83, one at each end of the platform, which lead through openings in the stringers 67 and are connected by a pin hinge 84 to screw 85 which is rigidly supported by journal 86 and by a threaded sleeve 87 in thrust bearing 88. The screw may be turned by a gear 89 keyed thereto and driven by a pinion 90 in turn driven by an electric motor 91 controlled from the operator's platform. The wheels 70, when at right angles to the tracks 66, are adapted to roll or ride on straight tracks 92 which extend transversely across the floor space between the elevators which carry the platform and when arranged at an angle of inclination to the track 66, as shown in dotted lines in Fig. 17, to roll or ride on the circular tracks 93. The wheels are set at the said positions by means of the gears 89, 90, the latter driven by motor 91, to place the rods 83 either in the full line or dotted line position of Fig. 17, and consequently shifting the axles 79. The wheels 71 preferably have double flanges to engage the sides of the rail 94 along which the wheels 71 travel. The wheels 72 travel either along straight rails 95 between the rails 92 and 94 or on the circular rails 96 as hereinafter explained.

The concentric circular rails 93 and 96 are arranged at any chosen spot and along the travel of the transfer table, that is, at any point between the sides of the building. If the wheels 70 and 72 are provided with flanges, then, of course, the connection between the tracks 92, 93, 95 and 96 respectively will be by suitable switches and frogs, but if the wheels do not have flanges then the connections between the said tracks will be a closed one and without switches.

In the floor or floors on which the transfer platform travels is a relatively small turn table 97 housed in a suitable framing below the level of the floor and concentric with the tracks 93, 96. Within the framing of the turn table are sockets 98 to receive wedges 99 on the transfer table which operate in guides 100 also on the transfer table. A rack 101 is secured to each wedge 99 and a pinion 102 is driven by an electric motor and speed reducer 103, the pinion meshing with the rack 101 to raise and lower the same and the wedge 99 carried thereby. The base (see Fig. 20) of the turn table, designated by the numeral 105, supports a circular track 106 on which are disposed four rollers 107 journaled in brackets 108 depending from the top portion 109 of the turn table. The top portion 109 carries a depending centering pin 110 disposed in the socket 111 on the base 105, forming a pivot bearing for the top 109 and turn table. The rail 94 is cut at the edges of the turn table 97, and the short section of track 112 is in alinement with the track 94 and is carried by the top 109 of the turn table. An electric contact block 113 (see Figs. 12 and 17) is carried by the transfer table and arranged similar to the wedges 99, that is, the contact is connected to a rack bar meshing with a pinion actuated by shaft 114 which is driven from the motor 103 which drives the pinions for actuating the racks and wedges, etc., a suitable chain 103' operating both wedges and contact block simultaneously.

At both ends of the transfer table there are locking devices to maintain the transfer table in proper position with the rails 66 alined with the rails of the desired tracks on the storage floors when a car is being moved onto a table or thereoff. These locking devices consist of bolts or latches 116 which are pivotally connected at 117 to a lever 118 also pivoted to a link 119 actuated by lever 120 on the operator's platform, the link 118 being pivoted intermediate its ends so that when the lever 120 is pulled back the latch 116 will be retracted, and when the lever 120 is pushed forward the latch will be projected into socket 121 provided in the floor adjacent the tracks. At the other end of the table there may be provided a latch pin 116', lever 118', and link 119' similar to the unprimed parts just described, and the arrangement or connection of the lever in both of the links may be such that in a neutral position both of the pins or locking devices are retracted, but by moving the lever one way or the other the pins may be alternately projected. Of course, separate levers may be provided for each of the links.

The electric motors which actuate the transfer table and the operable parts thereof are supplied by cables or third rail 123 under the floor and against which the shoe 122 carried by the transfer table engages when the table is traveling in a straight line across the tracks on the floor. However, when the table is rotating, electric contact block 113 supplies the current through contact with the circular third rail or cables 123' in the floor of the turn table. The groove 124 in the wall of the building is provided to receive the shoe at the end of the table which is remote from the rail or cables 123, there being shoes at both ends of the table so that it may operate from either end after making a half revolution to reverse a car.

In operation, if one or more cars are to be moved from one floor to another and consequently one track to another, one of the elevators 62 is raised up or lowered down to the floor on which the car is located and the transfer table is run from the elevator by the operator establishing the motor 75 in circuit with the rail or cables 123 through the shoe 122, so that the shafts 73 are rotated in the proper direction to drive the wheels 72 to propel the table along the rails 92, 95, 94 until the table comes to the position where the tracks 66 are in registry with the tracks on which the car is located. The latches 116 are then engaged in the sockets 121 to maintain the table against lateral movement until the car is placed on the table which may be done in several ways, none of which are shown. For instance, the turn table may be equipped with a winch and cable to pull the car on, or the car may be pushed on by a locomotive or by any other means. When the car is on the table the wheels are blocked to prevent it from rolling off and the motor 75 is again operated to actuate the transmission and shafts 73 to propel the table into alinement with the tracks onto which the car is to be rolled, at which time the latches 116 are again engaged in the sockets 121. The wheels facing the tracks onto which the car is to be rolled are unblocked and the car is then rolled or pulled off. Of course, if a car is to be conveyed from one floor to another the transfer table with the car thereon is propelled onto one of the elevators, taken up or down, and the foregoing conveying and unloading operation is performed.

Assuming that the car is to be reversed, which is quite usual with observation and dining cars, the transfer table is brought into alinement with the tracks on which the car is located and after the car is on the table, it is propelled by the motor 75 until the center of the table is in alinement with the center of the turn table 97. Motors 91 are started to turn the screws 85 and set the wheels 70 at an angle of inclination to the track 66 for true rolling contact on the rails 93. At this time, the wheels 71 are located on section of track 112 on the turn table. The transmission is then adjusted to permit rotation of the wheels 72 in opposite directions. The motor 103 is then actuated to lower the wedges 99 into the sockets 98 to lock the turn table and transfer table together. The lowering of the wedges by operation of the motor 103 caused rotation of the shaft 114, and the pinion keyed thereto to actuate the rack attached to the contact 113 to lower the contact into engagement with the power rail or cables 123'. When the motor 75 is operated, the turn table will be driven by the wheels 72, due to the fact that it is coupled to the transfer table by wedges 99, to turn the transfer table one-half revolution, at which time the motor 75 is stopped. Motor 103 is then operated to raise contacts 113 and wedges 99. The transmission is then adjusted to cause the wheels 72 to rotate in the same direction, the motors 91 turn the screws 85 in the reverse direction to set the wheels 70 straight with the tracks 92, and the car is conveyed to the desired track.

In Fig. 1, I have shown in dot and dash lines, the different positions which the main section of the bridge may occupy, and I have indicated the degree of the angle for each position. I have also shown in Fig. 1, spaces which may be used as machine rooms, shops, etc., and offices within the building. In Fig. 11, I have shown location of stairways to lead from one floor to another, and also the possible position or location of passenger elevators to convey employees and workmen from one floor to another.

Of course, the building may be equipped with a heating plant so that in cold weather the cars may be kept warm within the building. The cars will also be protected within the building from sun, rain, snow, and dust.

Due to the great size and especially great length of the building, it might be desired in some localities to utilize the roof as a landing for aeroplanes, and I have shown in dotted lines an aeroplane on the roof in the structure of Fig. 1, and in full lines an aeroplane on the roof in Fig. 5.

What I claim is:

1. Storage means for railroad cars and trains comprising a main level having tracks, a building spaced from the ends of said tracks and having a plurality of superposed floors each having tracks alined with said first tracks, a bridge having one end pivotally supported adjacent said first tracks and its other end free to move up and down adjacent the ends of the second tracks, said bridge carrying tracks one end of which terminate in proximity to and alined with said ends of said first tracks and the other ends of the bridge tracks terminating adjacent and in alinement with said second tracks at predetermined selective positions of the bridge, means to raise and lower the bridge to establish its tracks in registry with said first tracks and any of said second tracks to permit passage of cars thereover and into or out of the building from or to said first tracks, and means independent of said raising and lowering means for holding said bridge in selected positions during passage of cars thereover.

2. The structure of claim 1 wherein the floors of the building and ends of the tracks thereon terminate in different vertical planes which are intersected by the arc described by the second end of the bridge during raising and lowering.

3. Storage structure for railroad cars and trains comprising a main level having tracks, a building having a plurality of superposed floors each having tracks alined with said first tracks and spaced from the ends thereof, a bridge having one end supported adjacent said first tracks and its other end free to move up and down adjacent the ends of the second tracks, said bridge carrying tracks which terminate in proximity to and in alinement with said ends of said first tracks, and the other ends of the bridge tracks terminating adjacent and in alinement with said second tracks at predetermined selective positions on the bridge, means to raise and lower the bridge to establish its tracks in registry with said first tracks and any of said second tracks to permit passage of cars thereover and into or out of the building from or to said first tracks, means for holding said bridge in selected positions during passage of cars thereover, and means at the other ends of the tracks within the building for moving cars from one track to another.

4. Storage means for railroad cars and trains comprising a main level having tracks, a building spaced from the ends of said tracks and having a plurality of superposed floors each having tracks alined with said first tracks, a bridge having one end pivotally supported adjacent said first tracks and its other end free to move up and down adjacent the ends of the second tracks, said bridge carrying tracks one end of which terminates in proximity to and alined with said ends of said first tracks and the other ends of the bridge tracks terminating adjacent and in alinement with said second tracks at predetermined selective positions of the bridge, means to raise and lower the bridge to establish its tracks in registry with said first tracks and any of said second tracks to permit passage of cars thereover and into or out of the building from or to said first tracks, and means for holding said bridge in selected positions during passage of cars thereover, and means at the other ends of the tracks within the building for moving cars from one track to another, said last means being operable to also turn cars to reverse positions.

5. Storage structure for railroad cars and trains comprising a building having a plurality of superposed floors each having tracks thereon, a main level having tracks alined with the building tracks, a bridge having one end at said main level and tracks alined with the end of said main level tracks, a compensating section between the main section and said first tracks pivotally connected to the main section at one end and slidably supported at its other end adjacent said first tracks, a carrier support for the other end of the bridge, cables connected to said support, counterbalance weights connected to the cables, sheaves over which the cables run, means for lifting and lowering said support and the end of the bridge carried thereby to selectively establish the tracks of the bridge substantially in registry with the tracks on the different floors of the building, and means independent of said cables and weights cooperating with said carrier support to hold said other end of the bridge at selected floors.

6. Storage structure for railroad cars and trains comprising a building having a plurality of superposed floors each having tracks thereon, a main level having tracks alined with the building tracks, a bridge pivotally supported at one end at said main level and having tracks terminating adjacent the end of said main level tracks, a swivelled carrier support for the other end of the bridge movable to different angles at different positions of the bridge, cables connected to said support, counterbalance weights connected to the cables, a sheave over which the cables run, and means for lifting and lowering said support and the end of the bridge carried thereby to establish the tracks of the bridge substantially in registry with the tracks on the different floors of the building, and means at each floor engageable with said support to firmly hold the bridge in position at any floor while cars or trains pass thereover.

7. A storage structure for railway trains and cars comprising a building having main level tracks running therethru and over which incoming and outgoing trains may run, said building also having several superposed floors provided with relatively long tracks on which trains may be stored, a bridge pivotally mounted at one end on the main level and provided with tracks alined with tracks on the main level and tracks on the floors of the building, and means for raising and lowering the other end of the bridge to bring its tracks into registry with tracks on the floors of the building so that trains may travel thereover into and out of the building from and to the main level.

8. A storage structure for railway trains and cars comprising a building having main level tracks running therethru and over which incoming and outgoing trains may run, said building also having several superposed floors provided with tracks on which trains may be stored, a bridge having one end mounted on the main level and provided with tracks alined with tracks on the main level, and means for raising and lowering the other end of the bridge to bring its tracks into registry with tracks on the floors of the building so that trains may travel thereover into and out of the building from and to the main level, and means at the other end of the building for conveying cars from the tracks on one floor to the tracks on another.

9. A storage structure for railway trains and cars comprising a building having main level tracks running therethru and over which incoming and outgoing trains may run, said building also having several superposed floors provided with tracks on which trains may be stored, a bridge having one end pivotally mounted on the main level and provided with tracks alined with tracks on the main level, and means for raising and lowering the other end of the bridge to bring its tracks into registry with tracks on the floors of the building so that trains may travel thereover into and out of the building from and to the main level, and means within the building to receive individual cars from any of the tracks and to reverse or turn said cars.

10. Storage apparatus for railroad cars comprising a building having a floor of considerable area provided with tracks running longitudinally of the building and terminating in spaced relation to an end thereof, tracks in said space running transversely of the building, a combined transfer and turntable on said second tracks and provided with wheels, circular tracks in said space to which said second tracks are tangential, means for positioning the wheels of the table to roll on either said second tracks or circular tracks, and means for selectively driving said wheels to move said table on either of said tracks to cause the same to travel across the building or to rotate.

11. A storage structure for railroad cars and trains comprising a building having a main level and a plurality of floors each of considerable area, track sections on said main level and on said floors, bridges at opposite ends of the building having track sections thereon, and means for raising and lowering the ends of said bridges adjacent the ends of the track sections on the main level and said floors to establish the track sections on the bridges flush with track sections on any of said floors and on the main level to selectively form inclined or straight runways whereby cars or trains may pass through said building over inclined or straight runways.

FERRIS LE ROY FRANCISCO.